United States Patent [19]

Hase

[11] 3,971,957
[45] July 27, 1976

[54] ELECTRICAL LOAD TRANSFER CONTROL SYSTEM

[76] Inventor: Alfred Max Hase, 6 Manorwood Road, Scarborough, Ontario, Canada

[22] Filed: May 30, 1975

[21] Appl. No.: 582,200

[52] U.S. Cl. .................................................. 307/64
[51] Int. Cl.² .......................................... H02J 9/00
[58] Field of Search ................... 307/64, 66, 60, 61, 307/62, 63, 80, 43

[56] References Cited
UNITED STATES PATENTS 3,612,894   10/1971   Schmidt ................................ 307/64

Primary Examiner—Herman Hohauser
Attorney, Agent, or Firm—Donald E. Hewson

[57] ABSTRACT

In an electrical system having two power sources, one being an inverter and the other being a commercial power souce, where the load is critical and is normally connected to the inverter, a load transfer control system is provided to assure uninterrupted power supply to the load in the event of inverter failure. The load transfer control system includes a fault detector connected to the inverter, a fast-acting and normally open switch connected to the commercial power source and the load, and a slower acting and normally closed switch connected to the inverter and the load. When an inverter fault is sensed, there is a momentary make-before-break switch action of the two switches. A ferroresonant circuit is in the inverter circuit, and has a storage element with enough energy storage capacity to carry the load during the period that it takes for the fault detector to operate and the first switch to close. The switches are contactors or similar devices, so that there is complete voltage and current isolation of one power source from the other when the respective switch is open.

9 Claims, 2 Drawing Figures

ELECTRICAL LOAD TRANSFER CONTROL SYSTEM

FIELD OF THE INVENTION

This invention relates to a control circuit for an electrical power system having two power sources, to control the transfer of the load on the system from one power source to the other. More particularly, this invention relates to a switching control circuit arrangement for power system having an electrical inverter as the primary power source and an ordinarily available AC source (i.e., a commercial power source) as the alternate or standby power source.

Background of the Invention:

There may very often be a circuit arrangement established for a critical load such as a computer or a telemetry or telephone station, where it is desired that the quality of the electrical power delivered to the load be very high. Thus, an electrical power system may be arranged where the primary electrical power source is from an inverter, whose output can be closely regulated. Such an inverter may be as taught in Applicant's co-pending application Ser. No. 210,373, filed Sept. 30, 1974. In any event, the inverter delivers alternating current power to the load within very closely regulated voltage and waveform tolerances, and at the same frequency as an ordinarily available power source such as the commercial power which is purchased from the local power company or governmental power authority. An inverter is normally powered from a commercial power source through a float-charge rectifier circuit or other suitable DC circuits; with a standby battery also being maintained at full charge from the same DC source so that in the event of failure of the commercial power source, the battery provides power to the inverter. In any event, the inverter output is isolated from the commercial power source, and thus has a closely regulated voltage and waveform. It is usual that the frequency of the inverter output is synchronized to the commercial power source, as discussed in greater detail hereafter.

The output circuitry of an inverter would normally employ some form of waveform shaping and voltage regulating device. More recently, however, the use of ferroresonant voltage regulating circuits in the output circuitry of an inverter — or at least in the line between the inverter output and the load — has been established, where the ferroresonant voltage regulating circuit has energy storage devices which serve to provide the energy needed to assure the regulated output. A particularly useful ferroresonant voltage circuit is taught in Applicant's U.S. Pat No. 3,824,449 issued July 16, 1974.

In the event that the uninterrupted or no-break power source — the inverter — for a critical load should fail, means should be provided to transfer the load to a secondary or alternative power source — usually the ordinarily available commercial power source — without interruption of power flow to the critical load. It has been proposed to use solid state switches, which may be very fast acting by being SCR-operated, in series with each of the inverter and the commercial power source, and to operate the switches in such a manner that because of their load transfer characteristics, one switch may open and the other close without any interruption of the power flow to the load. Such SCR-operated switches are power isolating when they are open, so that at any time the load is connected for power flow purposes to only one source of power.

However, the use of such SCR-operated switches constitutes real hazards to the electrical system, and to persons working upstream of the system on the commercial power lines, as discussed in greater detail hereafter.

In the first instance, as noted above, SCR-operated switches are power isolating but not voltage isolating; and such devices have inherent resistive and capacitive leakage. Thus, in the event that there is a power outage of the commercial power system, and a portion of the commercial line is isolated from its source, the line is still connected through the SCR-operated switch to the inverter power supply in a voltage sense; and any person who approaches the line with the belief that it is dead might be injured or killed by contacting the inverter voltage reflected back into the line through the switch. Therefore, the use of solid state SCR-operated switches constitutes a safety hazard to persons who are working on the commercial power lines upstream of an electrical power system as discussed above.

Another great hazard that may exist when SCR-operated switches are used in a two power source electrical power system for critical loads, as discussed above, is that in the event of an SCR failure — or the failure of the SCR gating circuitry, transfer circuitry or synchronous electronic circuitry — the two power sources will be connected in parallel with two parallel current sources, and without protection and automatic isolation circuitry. Such an arrangement is, of course, contrary to all electrical safety rules; and is expressely prohibited in most jurisdictions by the appropriate electrical power or safety standards authorities.

This invention provides a solution to the problem of having to provide total power and voltage isolating of one power source from another in a two power source electrical power system, while assuring an uninterrupted power flow to a critical load, by using mechanical switching means which may be a contactor or similar device, and by assuring a momentary make-before-break switching function to transfer the load from the inverter power source to the commercial power source in the event of inverter power failure; and at the same time by providing an energy storage device in the output of the inverter — or in any event, in the line between the inverter and the load — which has at least sufficient energy storage capacity substantially to provide the energy requirement of the load during the time that it takes for the load to be transferred to the commercial power source. Thus, mechanical switches having discrete operating periods can be employed while assuring an uninterrupted supply of power to the critical load. In other words, non-instantaneously operating switching elements may be used, which are off-the-shelf items, and an uninterrupted power flow to a critical load may be assured; while at the same time assuring safety of operation and compliance with electrical code regulations and normal electrical safety operating standards. As well, the above may be assured with economy, by using inexpensive off-the-shelf components for the major circuit integers.

BRIEF SUMMARY OF THE INVENTION

A primary object of this invention is to provide a control circuit for a two power source electrical power system where an uninterrupted power flow to a critical load is assured in the event of transfer of the load from one of the power sources to the other; while at the same time assuring that each power source is totally isolated from the other under normal operating conditions of either power source.

Another object of this invention is to provide a power transfer control and switching arrangement economically, using off-the-shelf components of simple design rather than complicated solid state or SCR-operated switches and their associated electronic sensing and logic circuitry, which are subject to high failure rates.

BRIEF DESCRIPTION OF THE DRAWINGS

These and other features and objects of this invention are more clearly described hereafter; in association with the accompanying drawings, in which.

DESCRIPTION OF THE PREFERRED EMBODIMENT

Figure 1:
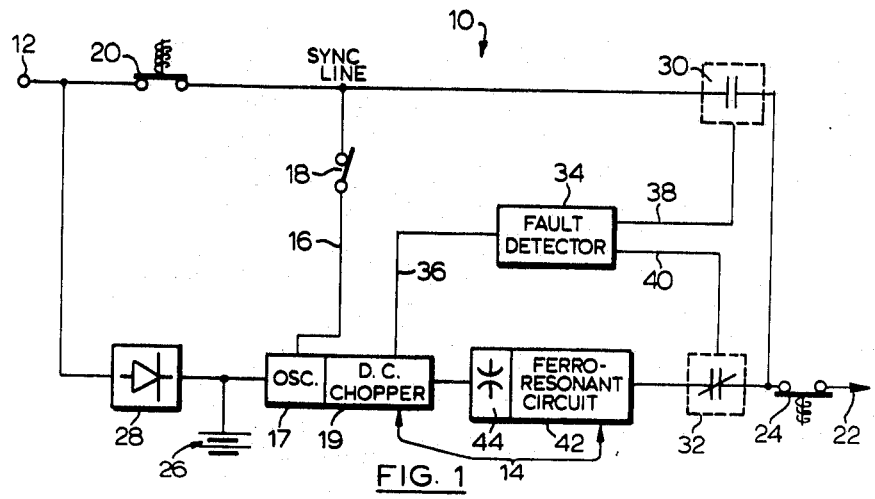
FIG. 1 is a block circuit diagram of a preferred embodiment of the present invention, showing the principal operating components thereof.
Figure 2:
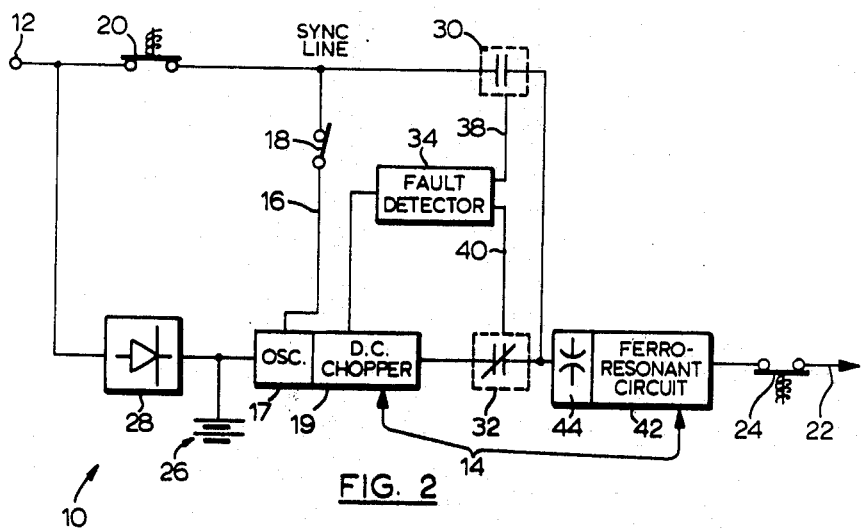
FIG. 2 is similar to FIG. 1 and shows an alternative circuit arrangement for the present invention.

The circuits of FIGS. 1 and 2 are drawn in the single-line, block circuit convention for electrical power systems, and show the principal operating components of this invention. None of these components are, themselves, a product of this invention; and therefore, because they might have differing specific electrical and physical embodiments and configurations, they are illustrated functionally.

Thus, the circuit of FIG. 1 shows an electrical power system 10 having two power sources, where the first power source is an ordinarily available alternating current source 12, that is to say a commercial power source from the local power company or power authority; and the second power source is an inverter 14 having its output synchronized to the commercial power source. This is accomplished by providing a synchronization line 16 having isolating switch 18 from the commercial power source to the inverter oscillator 17 and DC chopper circuitry 19 (not specifically shown) in the inverter 14. (A by-pass 20 is provided, to isolate the system 10 when the inverter 14 is not working, if required.)

The output of the system 10 is connected to a load at 22, through a by-pass 24. The inverter 14 is normally fed from the commercial power source 12 through float-charge rectifier circuitry 28 which is connected thereto. Standby battery 26 is maintained at full charge from the same DC output of circuit 28. The precise nature of the circuitry of the inverter 14, battery 26 and float-charge rectifier circuitry 28 is not indicated, all of these items being well known and having a variety of commercial embodiments.

The nature of the circuits of FIGS. 1 and 2, and of the invention, is that a critical load which is an alternating current load operating in synchronous fashion — such as a computer — is normally connected at 22 to the system 10 which is so arranged that the inverter 14 is connected to the load. Further, the inverter 14 is isolated at its input side by the float-charge rectifier circuit 28 from the commercial power source 12.

This invention thus provides a control system for providing an essentially uninterrupted power flow to the load in the event of failure of the inverter 14 by transferring the load to the commercial power source 12, and for isolating the inverter 14 from the commercial power source 12 when the latter is connected to the load.

There is therefore provided a first controllable and normally open mechanical switch 30, which is connected to the commercial power source 12 and to the load; and a second controllable and normally closed switch 32, which is connected to the inverter 14 and to the load.

A fault detector or fault sending means 34 is connected to the inverter 14 by line 36, and is such that it will sense any fault in the inverter 14 while the inverter is connected to the load. Any fault in the inverter 14 — 90% of which faults would be in the commutation section of the inverter — would result in failure of the inverter to continue to provide power to the load. Thus, the control system of this invention acts to transfer the load as quickly as possible to the commercial power source 12 by causing switch 30 to close; and to isolate the inverter 14 from the load by causing switch 32 to open. The fault detector 34 is such that when any fault in the inverter 14 is sensed, control signals are nearly instantaneously sent over lines 38 and 40 to switches 30 and 32 respectively. [At the conventional power frequency of 60 Hz, the fault detector may operate in less than 2 msec.]

The operating period of the switch 30 is chosen to be less than the operating period of switch 32, so that switch 30 closes (makes) before switch 32 opens (breaks). Thus, a make-before-break, operation of switches 30 and 32 is assured. [Typically, at the conventional power frequency of 60 Hz, the operating period of switch 30 may be 8–10 msec (or about 0.5 cycle); while the operating period of switch 32 may be 16–50 msec (or about 1 to 3 cycles), and usually 20–30 msec.]

A ferroresonant circuit 42 having an energy storage element 44 — and all ferroresonant circuits have energy storage elements such as a capacitor — is connected in the output of the inverter 14. In the preferred embodiment of FIG. 1, the ferroresonant circuit is directly connected with the DC chopper circuitry 19, as discussed above. However, a ferroresonant voltage regulating circuit 42 might be connected between the switch 32 and load, as shown in FIG. 2. In any event, the energy storage element 44 has at least sufficient energy storage capacity so as to substantially provide the energy requirement of the load for the length of time of the operating period of the switch 30 plus the length of time it takes for the fault detector 34 to emit a signal to the switch 30 after a fault is sensed in the inverter 14. (It is understood, of course, that any fault in the inverter 14 results in nearly instantaneous collapse of the DC chopper output per se.) The make-before-break operation of switches 30 and 32, together with the continued synchronous energy supply from the storage element 44 of the ferroresonant circuit 42 to the load, assure an uninterrupted power supply to the load as it is transferred from inverter 14 to the commercial power source 12; and while there might be a slight voltage dip, the load does not see any change in its power supply. Of course, because of the criticality of the voltage and waveform requirements of the load, appropriate signals or other indications are given for service personnel to examine and repair any fault in the inverter 14 and to transfer the load back to the inverter as quickly as possible. In that event, re-synchronization of the inverter 14 to the commercial power source 12 will be necessary; and the inverter is brought on-line through switch 32 before the switch 30 is opened such as by manual operation thereof.

It will be seen that when switch 30 is open, there can be no feedback of voltage from the inverter 14 to the line connecting the system 10 to the commercial power source 12. Likewise, because the switch 30 is a mechanical switch which has an actual physical opening or gap, there is voltage isolation of the power sources and no chance of inadvertent parallel connection of current sources.

The switch 30 is normally a controllable contactor, but it may also be a relay or fast-acting motor-operated switch; provided only that it is compatible to an operating control signal from the fault detector 34, and that its operating period is less than that of switch 32. Likewise, switch 32 may be a controllable contactor; or it may be a shunt trip breaker in the inverter 14. Each of switches 30 and 32 might also be solid state switch devices, but in that case they would be required to have isolating means to assure that there is both voltage and current interruption at either switch when that switch is open.

In the circuit configuration shown in FIG. 2, the ferroresonant circuit 42 is on the load side of switch 32, so that the energy storage element 44 is connected to the load no matter what condition the switch 32 may be in. In that case, simultaneous operation of switches 30 and 32 may be accommodated; and switches 30 and 32 may, indeed, be contactors or other fast operating switches which might physically be mounted together.

The various circuit elements such as the oscillator 17, DC chopper 19, battery 26 and float-charge rectifier circuit 28 may have internal disconnects for their own protection, but these are not shown.

Other modifications, substitutions and alterations may be made to the circuits discussed above, without changing or altering their functional operation, and without departing from the spirit and scope of the appended claims.

I claim:

1. For use in an electrical power system having two power sources, where the first power source is an ordinarily available aternating current source and the second power source is an inverter having an output synchronized to said first power source, and where the load is an alternating current load which is normally connected to the output of said second power source; a control system for providing an essentially uninterrupted power flow to said load in the event of failure of said second power source by transferring said load to said first power source, and for isolating said second power source from said first power source when said first power source is connected to said load, comprising:

first controllable and normally open switch means having a first operating period to close, and being connected to said first power source and to said load;

second controllable and normally closed switch means having a second operating period to open, and being connected to said second power source and to said load;

each of said first and second switches being such that the respective power source is both current and voltage isolated from said load when that switch is open;

fault sensing means connected to said second power source for sensing any fault therein while said second power source is connected through said second switch means to said load; said fault sensing means being connected to said first switch means so as to emit a first control signal to cause said first switch means to close when a fault in second power source is sensed, and being connected to said second switch means so as to emit a second control signal simultaneously with said first control signal to cause said second switch means to open;

and a ferroresonant circuit having an energy storage element connected between said second power source and said load so as to be connected to said load even after any failure of said second power source for at least the length of time of said second operating period;

said first operating period being shorter than said second operating period so that said first switch means is closed before said second switch means is opened after a fault in said second power system has been sensed; said energy storage element having at least sufficient energy storage capacity substantially to provide the energy requirement of said load for the length of time of said first operating period plus the operating period of said fault sensing means.

2. The control system of claim 1 where said energy storage element is connected between said second switch means and said load.

3. The control system of claim 1 where said energy storage element is connected to the output of said second power source and to said load.

4. The control system of claim 3 where said first switch means is a controllable contactor.

5. The control system of claim 3 where said first switch means is a fast-acting motor-operated switch.

6. The control system of claim 3 where said second switch means is a controllable contactor.

7. The control system of claim 3 where said second switch means is a shunt trip breaker in said inverter.

8. The control system of claim 3 where said first and second switch means are each solid state switch devices.

9. The control system of claim 3 where, when at least said first switch means is a solid state switch device, it has isolating means associated therewith so as to assure both voltage and current isolation of said load when said first power source is non-operative.

* * * * *